Oct. 9, 1962 W. H. COATES ETAL 3,057,701
APPARATUS FOR THE DISTRIBUTION OF GASES
Filed Sept. 26, 1957 2 Sheets-Sheet 1

INVENTORS
WILLIAM HENRY COATES and
JOHN HAYDEN
BY
*Oscar L. Spencer*
ATTORNEY

Oct. 9, 1962 W. H. COATES ETAL 3,057,701
APPARATUS FOR THE DISTRIBUTION OF GASES
Filed Sept. 26, 1957 2 Sheets-Sheet 2

INVENTORS
WILLIAM HENRY COATES and
JOHN HAYDEN
BY
Oscar L. Spencer
ATTORNEY

United States Patent Office 3,057,701
Patented Oct. 9, 1962

3,057,701
APPARATUS FOR THE DISTRIBUTION OF GASES
William Henry Coates, Stockton-on-Tees, and John Hayden, Middlesbrough, England, assignors to British Titan Products Company Limited, Billingham, England, a British company
Filed Sept. 26, 1957, Ser. No. 686,511
Claims priority, application Great Britain Sept. 27, 1956
4 Claims. (Cl. 23—284)

This invention is for improvements in or relating to apparatus for the distribution of gases and has particular reference to apparatus for introducing and distributing gases through a perforated plate suitably protected for the maintenance of a uniformly fluidised bed in the continuous chlorination of titanium oxide and other titaniferous materials by a fluidised bed process.

In application 565,251, filed Feb. 13, 1956, now United States Patent No. 2,957,757, of which this application is a continuation-in-part, there is described apparatus (hereinafter referred to as apparatus of the kind described) for the continuous chlorination of titaniferous materials by a fluidised bed process comprising a shaft chamber to contain the fluidised bed provided at its lower end with a wind box and a perforated plate separating the fluidised bed from the wind box, a non-porous gas distributor tube passing through each perforation and sealed to the plate, each of the tubes having at its upper end a solids trap to prevent solids from the fluidised bed passing into the distributor tube and thence to the wind box, and being preferably fitted at its lower end with a detachable plug having a calibrated orifice of size predetermined to give rise to a pressure drop between the wind box and the distributor tube at least equal to the pressure drop across the bed.

It is an object of the present invention to provide improved apparatus of the kind described.

The invention accordingly provides apparatus of the kind described in which the non-porous gas distributor tube is made up of a number of interconnected parts and comprises a short length of pipe fitted through a perforation and sealed to the plate, and above the plate a robust upper pipe of a material resistant to chlorination at high temperatures which has the solids trap at its upper end and is jointed at its lower end to the upper end of the pipe fitted through the plate.

The upper pipe provided with the solids trap is preferably a thick walled pipe made, for example, of a selected firebrick material such as an aluminosilicate type, e.g. "Hardaxe" V.

The short pipe fitted through the plate may be a nipple externally screw-threaded at its ends, and the upper ceramic pipe may have a screwed fitting bonded to its lower end for connection to the nipple.

In the preferred construction, a metal socket receives and is bonded to the lower end of the upper ceramic pipe, and a union welded to the underneath of the socket is screwed on to the upper end of the nipple.

Suitable resins for bonding the ceramic pipe to the socket are epoxy resins.

One of the side branches of a T-piece may be screwed to the lower end of the nipple, the leg of the T-piece then extending horizontally and being closed by a plug through which a calibrated gas inlet hole is drilled, while the other downwardly extending branch is closed by a detachable plain plug which may be removed to permit clearance of any material which may enter the T-piece inadvertently.

The pressure drop across the orifice may be between ½ and 50 times the pressure drop across the bed.

An apparatus in accordance with the invention will now be described with reference to the accompanying drawings, in which:

FIGURE 1 is a plan view of a perforated plate constituting the base of a fluidised bed shaft chamber. It shows a circular metal plate 11 having seventy-three perforations 12 spaced as shown over the plate. The plate is attached to the wind box housing by a flange 13;

Figure 2:
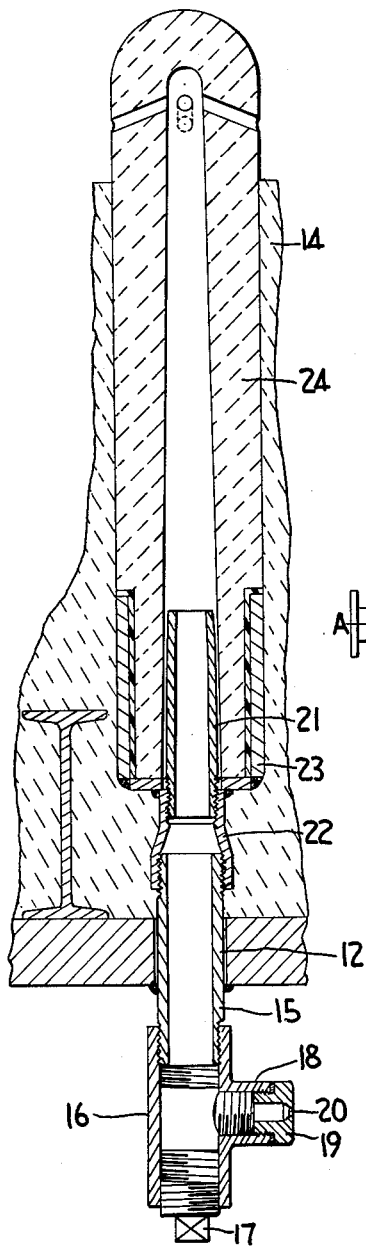
FIGURE 2 is an enlarged fragmentary sectional elevation taken on the line A—A of FIGURE 1.
Figure 1:
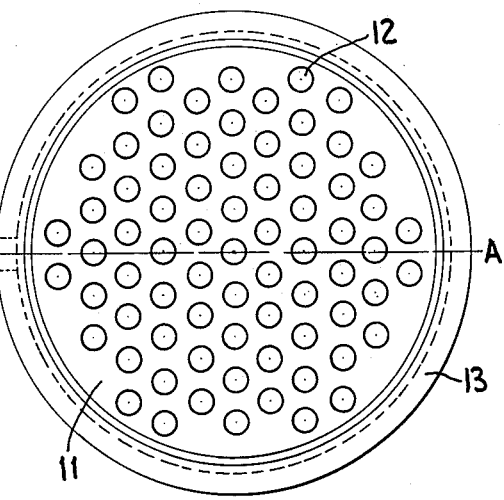
Figure 3:
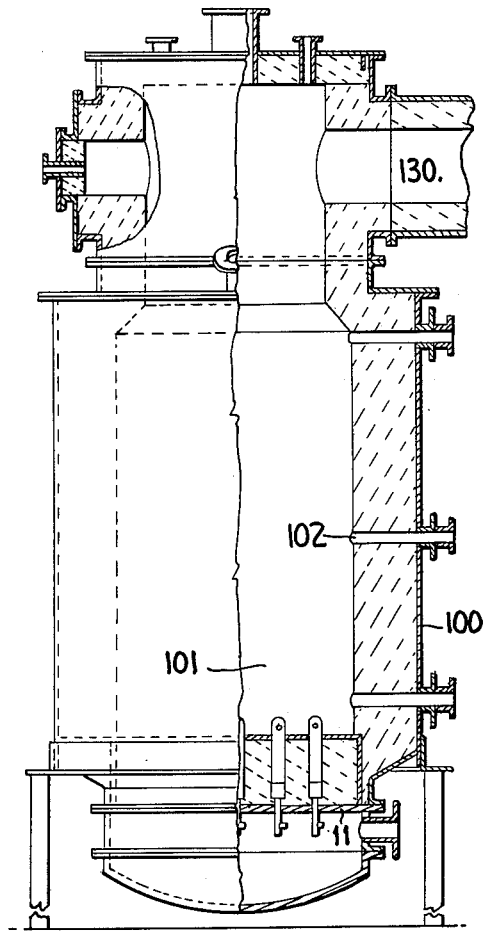
FIGURE 3 is a diagrammatic view, partially in section, illustrating the manner in which the base illustrated in FIGURE 1 is disposed in a typical shaft furnace 100.

FIGURE 2 shows the perforated plate 11 supporting insulating material 14 (4 parts expanded china clay and 1 part ciment fondu) which forms the base of the fluidised bed. A nipple 15 externally threaded at both ends passes through the perforation 12 and is welded to the plate 11. A T-piece 16 is screwed to the wind box side of the nipple, and the T-piece is sealed at the bottom by a detachable plain plug 17, the leg 18 of the T-piece being closed by a plug 19 through which a chlorine inlet hole 20 of predetermined diameter is drilled.

A length of tubing 21 is secured to the upper part of the nipple 15 by means of a union 22, and a cup-shaped steel support 23 is welded to the union. A non-porous pipe 24 fabricated in ceramic material is fitted into the support 23, and is sealed to it by means of a suitable resin such as an epoxy or silicone resin. The union 22, nipple 15 and T-piece 16 define a sleeve by which open connection is achieved between the inlet hole 20 and the non-porous pipe 24. The pipe 24 is suitably made of "Hardaxe" V, a material which has the following composition:

| | Percent | | Percent |
|---|---|---|---|
| $SiO_2$ | 60.3 | CaO | 0.9 |
| $Al_2O_3$ | 30.9 | MgO | 0.7 |
| $Fe_2O_3$ | 2.7 | $K_2O$ | 1.6 |
| $TiO_2$ | 2.0 | $Na_2O$ | 0.8 |

The internal diameter of the shaft chamber is approximately 5 feet, and the distance between the centres of two adjacent perforations is approximately 6 inches. The perforations are so arranged that excessive disturbance or violent action at the side of the chamber is reduced, and the distributor tubes in the peripheral row are not provided with apertures facing the wall in order to reduce attack at the chamber wall.

Distributor tubes made of ceramics are more robust and much more resistant to chlorine than silica tubes, and operate satisfactorily at temperatures of 1,000° C., or higher. The cost of the tubes fabricated in ceramics is approximately half the cost of silica tubes.

Following is a description by way of example of processes for the production of titanium tetrachloride from mineral rutile employing the apparatus described above and illustrated in the accompanying drawings.

*Example 1*

The shaft chamber 101 above the perforated plate was filled to a depth of 18 inches with a mixture of mineral rutile and coke screw fed through port 102.

The mineral rutile contained 96.4% $TiO_2$; and had a particle size-range of 70µ to 180µ. The coke had a particle size-range of 16 to 80 B.S.S. mesh.

Initially, air was fed into the wind box through the perforated plate assembly into the mixed rutile-coke bed. At the same time, a gas flame was played upon the bed to ignite the coke. The reaction of air with the gas and carbon content of the fluidised bed enabled pre-heating of the charge to a temperature of about 700° C., beyond which combustion of the coke proceeded in the absence of a flame. When the temperature had reached 900° C., the air was shut off, the mineral rutile-coke charge through port 102 was adjusted in the reactor to the proportion 4:1 and 1800 lbs. of chlorine per hour was admitted to the wind box. The rutile-coke feed was then introduced at the approximate rate of 12.2 tons per day. In this way, chlorination was immediately initiated and the plant ran continuously for 66 days, being maintained within a temperature range of 900–920° C., the gaseous products of chlorination being discharged from the chamber through port 130. During this period the bed was purged 5 times at intervals in order to maintain a high content of titanium dioxide, which would otherwise be lowered owing to the build-up of impurities such as zircon which do not chlorinate so easily in this temperature range.

The plant operated without difficulty and at the end of the run was examined with particular reference to the feed assembly. The device was found to be in good general condition.

The wind box and the metal orifices were free from the particulate constituents of the bed and free from signs of any significant corrosion. It was also found that the cup support holding the ceramic pipe was in sound condition and had not permitted gas leaks into the distributor structure.

*Example 2*

The reactor was started up and maintained in the manner described in Example 1 and the plant was allowed to operate continuously for 22 days. At the end of this period, analysis of the bed constituents showed 35% zircon to be present. The temperature of the bed was allowed to rise to approximately 980–1000° C., when chlorination was recommenced and continued for 15 hours, after which the zircon content of the bed was found to be reduced to 11%. When this stage had been reached, chlorination was continued for a further 21 days at 900–920° C., after which period the operating temperature was again raised to 980–1000° C., for a 15 hour interval, by which means the zircon content of the bed was reduced from 31% to 10%. At no time during the run was the bed removed from the reactor. At this stage the distributor device showed some slight plugging of the top ports but was in good general condition.

We claim:

1. In apparatus for chlorinating metal bearing material in a fluidized bed which comprises a shaft furnace having an interior portion providing a chlorination zone, a floor adjacent the lower portion of the chlorination zone and comprising a metal base and a layer of insulating cement above the metal base, a chlorine chamber below the floor, conduits extending through the floor, said conduits comprising a metallic sleeve extending through and above the metal base and sealed to the metal base to prevent escape of chlorine between the sleeve and the metal base, a ceramic non-porous pipe connected at the base thereof to the sleeve at a point above the metal base and extending from the sleeve to a point in the chlorination zone, said sleeve and pipe defining a channel extending from the chlorine chamber to a point of discharge in the chlorination zone, and a metallic orifice connected to the metallic sleeve, said orifice separating the channel from the chlorine chamber and being capable of establishing a substantial pressure drop between the chlorine chamber and the channel.

2. In apparatus for chlorinating a metal bearing material in a fluidized bed which comprises a shaft furnace having an interior portion providing a chlorination zone, a floor adjacent the lower portion of the chlorination zone and comprising a metal base and a layer of insulating cement above the metal base, a chlorine chamber below the floor, conduits extending through the floor, said conduits comprising a metallic sleeve extending above and below the bottom of the floor and sealed to the metal plate to prevent escape of chlorine between the sleeve and the metal plate, a ceramic non-porous pipe connected at the base thereof to the sleeve at a point above the metal base and extending from the sleeve to a point in the chlorination zone, said sleeve and pipe defining a channel extending from the chlorine chamber to a point of discharge in the chlorination zone, and a metallic orifice removably connected to the sleeve and disposed in the chlorine chamber, said orifice separating said channel from the chlorine chamber and being capable of establishing a substantial pressure drop between the chlorine chamber and said channel.

3. In apparatus for chlorinating metal bearing material in a fluidized bed which comprises a shaft furnace having an interior portion providing a chlorination zone; a floor adjacent the lower portion of the chlorination zone and comprising a metal base and an insulating cement layer above the base, a chlorine chamber below the floor, a plurality of conduits extending through the floor, said conduits comprising sockets disposed in said floor within said insulating layer, ceramic pipes having one end mounted in said sockets above said base and extending upward from the sockets into the chlorination zone, metal tubes associated with the sockets and extending downward through said floor to the chlorination chamber, said sockets, ceramic pipes, and metal tubes defining a plurality of channels extending from the chlorine chamber to a point in the chlorination zone above the floor and then downward to a discharge point in the chlorination zone, restricted orifices attached to said metal tubes, said orifices separating the chlorine chamber from said channels and being capable of providing a substantial pressure drop between the chlorine chamber and said channels.

4. In apparatus for chlorinating metal bearing materials in a fluidized bed which comprises a shaft furnace having an interior portion providing a chlorination zone: a floor adjacent the lower portion of the chlorination zone and comprising a metal base and an insulating cement layer above the base, a chlorine chamber below the floor, a plurality of conduits extending through the floor, each of said conduits comprising a threaded sleeve sealed to the metal base to prevent escape of chlorine between the sleeve and the metal plate and providing a socket above the floor bottom, a ceramic pipe having one end embedded in said socket and the other end extending above the top of the floor and into the chlorination zone, said sleeve, socket and ceramic pipe defining a channel extending from the chlorine chamber to the chlorination zone, means defining a restricted orifice removably connected to the threaded sleeve and being separated from the chlorination zone by the floor, said orifice communicating with the channel and separating the channel from the chlorine chamber and being capable of providing a substantial pressure drop between the chlorine chamber and said channel.

References Cited in the file of this patent

UNITED STATES PATENTS

| 1,498,741 | Loop | June 24, 1924 |
| 2,726,072 | Hermann | Dec. 6, 1955 |
| 2,813,016 | Thornhill | Nov. 12, 1957 |
| 2,841,476 | Dalton | July 1, 1958 |